United States Patent
Jang et al.

(10) Patent No.: US 12,300,807 B2
(45) Date of Patent: May 13, 2025

(54) POSITIVE ACTIVE MATERIAL FOR RECHARGEABLE LITHIUM BATTERY, PREPARING METHOD THEREOF AND RECHARGEABLE LITHIUM BATTERY INCLUDING THE SAME

(71) Applicant: Samsung SDI Co., Ltd., Yongin-si (KR)

(72) Inventors: Jungsue Jang, Yongin-si (KR); Donghyun Kil, Yongin-si (KR); Minhan Kim, Yongin-si (KR); Jinyoung Kim, Yongin-si (KR); Jinhwa Kim, Yongin-si (KR); Jihyun Seog, Yongin-si (KR); Jaeha Shim, Yongin-si (KR); Kiyong Ahn, Yongin-si (KR); Donggyu Chang, Yongin-si (KR); Youngjoo Chae, Yongin-si (KR); Aram Choi, Yongin-si (KR); Jeuk Ha, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 391 days.

(21) Appl. No.: 17/657,316

(22) Filed: Mar. 30, 2022

(65) Prior Publication Data
US 2022/0384780 A1    Dec. 1, 2022

(30) Foreign Application Priority Data
May 28, 2021   (KR) .................. 10-2021-0069175

(51) Int. Cl.
*H01M 4/36*    (2006.01)
*C01G 53/40*   (2025.01)
(Continued)

(52) U.S. Cl.
CPC ............ *H01M 4/364* (2013.01); *C01G 53/40* (2013.01); *C01G 53/44* (2013.01);
(Continued)

(58) Field of Classification Search
CPC ....... H01M 10/0525; H01M 2004/021; H01M 2004/028; H01M 4/0471; H01M 4/364;
(Continued)

(56) References Cited

U.S. PATENT DOCUMENTS 6,589,499 B2   7/2003   Gao et al.
10,056,605 B2  8/2018   Oh et al.
(Continued)

FOREIGN PATENT DOCUMENTS

CN    101167209 A    4/2008
CN    101714630 A    5/2010
(Continued)

OTHER PUBLICATIONS

Notice of Allowance for U.S. Appl. No. 17/073,124 dated Aug. 5, 2022, 5 pages.
(Continued)

*Primary Examiner* — Victoria H Lynch
(74) *Attorney, Agent, or Firm* — Womble Bond Dickinson (US) LLP

(57) ABSTRACT

Disclosed are a positive active material for a rechargeable lithium battery, a method of preparing the same, and a rechargeable lithium battery including the same. The positive active material includes a first positive active material in a form of secondary particles including a plurality of primary particles that are aggregated together, and a second positive active material having a single crystal form, wherein both of the first positive active material and the second positive active material are nickel-based positive active materials, each of the first positive active material and
(Continued)

the second positive active material is coated with cobalt, and a maximum roughness of a surface of the second positive active material is greater than or equal to about 15 nm.

20 Claims, 4 Drawing Sheets

(51) Int. Cl.
| | | |
|---|---|---|
| C01G 53/44 | (2025.01) | |
| H01M 4/04 | (2006.01) | |
| H01M 4/505 | (2010.01) | |
| H01M 4/525 | (2010.01) | |
| H01M 4/02 | (2006.01) | |

(52) U.S. Cl.
CPC ......... *H01M 4/0471* (2013.01); *H01M 4/366* (2013.01); *H01M 4/505* (2013.01); *H01M 4/525* (2013.01); *H01M 2004/021* (2013.01); *H01M 2004/028* (2013.01)

(58) Field of Classification Search
CPC ...... H01M 4/366; H01M 4/485; H01M 4/505; H01M 4/525; H01M 4/5825; Y02E 60/10
See application file for complete search history.

(56) References Cited

U.S. PATENT DOCUMENTS

| | | |
|---|---|---|
| 2004/0058243 A1 | 3/2004 | Ohzuku et al. |
| 2007/0122705 A1 | 5/2007 | Paulsen et al. |
| 2008/0026292 A1 | 1/2008 | Paulsen et al. |
| 2008/0248391 A1 | 10/2008 | Wakasugi et al. |
| 2009/0029253 A1 | 1/2009 | Itou et al. |
| 2009/0258296 A1 | 10/2009 | Kawasato et al. |
| 2010/0081055 A1 | 4/2010 | Konishi et al. |
| 2011/0079752 A1 | 4/2011 | Park et al. |
| 2011/0226986 A1 | 9/2011 | Wang et al. |
| 2011/0240913 A1 | 10/2011 | Kim et al. |
| 2012/0085967 A1 | 4/2012 | Yokoyama et al. |
| 2012/0100429 A1 | 4/2012 | Sueki et al. |
| 2012/0261610 A1 | 10/2012 | Paulsen et al. |
| 2013/0316237 A1 | 11/2013 | Miki |
| 2014/0106212 A1 | 4/2014 | Choi et al. |
| 2014/0131633 A1 | 5/2014 | Ito et al. |
| 2014/0205898 A1 | 7/2014 | Lee et al. |
| 2014/0205906 A1 | 7/2014 | Kudo et al. |
| 2014/0212759 A1 | 7/2014 | Blangero et al. |
| 2015/0010819 A1 | 1/2015 | Lee et al. |
| 2015/0064577 A1 | 3/2015 | Natsui et al. |
| 2015/0093580 A1 | 4/2015 | Kobayashi et al. |
| 2015/0228971 A1 | 8/2015 | Kim et al. |
| 2015/0340686 A1 | 11/2015 | Sun et al. |
| 2016/0156020 A1 | 6/2016 | Tokoro et al. |
| 2016/0301069 A1 | 10/2016 | Kwak et al. |
| 2016/0380263 A1 | 12/2016 | Nakayama et al. |
| 2017/0222211 A1 | 8/2017 | Ryu et al. |
| 2017/0222221 A1 | 8/2017 | Park et al. |
| 2017/0222225 A1 | 8/2017 | Kang et al. |
| 2017/0309910 A1 | 10/2017 | Jo et al. |
| 2017/0317342 A1 | 11/2017 | Kang et al. |
| 2017/0358799 A1 | 12/2017 | Gunji et al. |
| 2018/0026268 A1 | 1/2018 | Kim et al. |
| 2018/0048015 A1 | 2/2018 | Lee et al. |
| 2018/0108940 A1 | 4/2018 | Kwon et al. |
| 2018/0151876 A1 | 5/2018 | Kim et al. |
| 2018/0212237 A1 | 7/2018 | Lee et al. |
| 2018/0248180 A1 | 8/2018 | Liu et al. |
| 2018/0261842 A1 | 9/2018 | Park et al. |
| 2018/0316005 A1 | 11/2018 | Shin et al. |
| 2019/0020024 A1 | 1/2019 | Wang et al. |
| 2019/0044127 A1 | 2/2019 | Kim |
| 2019/0173076 A1 | 6/2019 | Kim et al. |
| 2019/0296349 A1 | 9/2019 | Cho et al. |
| 2019/0355981 A1 | 11/2019 | Chang et al. |
| 2020/0083531 A1 | 3/2020 | Choi et al. |
| 2020/0127276 A1 | 4/2020 | Kim et al. |
| 2020/0144610 A1 | 5/2020 | Hong et al. |
| 2020/0185714 A1 | 6/2020 | Han et al. |
| 2020/0295368 A1 | 9/2020 | Kong et al. |
| 2021/0119204 A1 | 4/2021 | Celasun et al. |
| 2021/0167366 A1 | 6/2021 | Leng et al. |
| 2022/0029147 A1 | 1/2022 | Ogawa et al. |
| 2022/0029158 A1 | 1/2022 | Takamori |
| 2022/0059836 A1 | 2/2022 | Hiratsuka et al. |
| 2022/0238872 A1 | 7/2022 | Kim et al. |
| 2023/0018761 A1 | 1/2023 | Kageura et al. |
| 2023/0155123 A1 | 5/2023 | Lee et al. |

FOREIGN PATENT DOCUMENTS

| | | |
|---|---|---|
| CN | 105185982 A | 12/2015 |
| CN | 107112515 A | 8/2017 |
| CN | 107251282 A | 10/2017 |
| CN | 112151794 A | 12/2020 |
| CN | 112750999 A | 5/2021 |
| CN | 114556614 A | 5/2022 |
| CN | 114784263 A | 7/2022 |
| CN | 116565177 A | 8/2023 |
| EP | 1 876 664 A1 | 1/2008 |
| EP | 2 169 745 A1 | 3/2010 |
| EP | 3 425 703 B1 | 9/2019 |
| EP | 3647269 A1 | 5/2020 |
| EP | 3723172 A2 | 10/2020 |
| JP | 2001-167761 A | 6/2001 |
| JP | 2013-038022 A | 2/2013 |
| JP | 2013-120676 A | 6/2013 |
| JP | 2015-076397 A | 4/2015 |
| JP | 2016-51503 A | 4/2016 |
| JP | 2016-76294 A | 5/2016 |
| JP | 2018-014326 A | 1/2018 |
| JP | 2018-92931 A | 6/2018 |
| JP | 2018-531500 A | 10/2018 |
| JP | 2018-532236 A | 11/2018 |
| JP | 6544951 B2 | 7/2019 |
| JP | 2020-72092 A | 5/2020 |
| JP | 2020-77611 A | 5/2020 |
| JP | 2020-87879 A | 6/2020 |
| JP | 2021-508410 A | 3/2021 |
| JP | 2021-95298 A | 6/2021 |
| KR | 2003-0045853 A | 6/2003 |
| KR | 10-2006-0105039 A | 10/2006 |
| KR | 10-2009-0032138 A | 3/2009 |
| KR | 10-2010-0130522 A | 12/2010 |
| KR | 10-2011-0109879 A | 10/2011 |
| KR | 10-1154880 B1 | 6/2012 |
| KR | 10-1244050 B1 | 3/2013 |
| KR | 10-2014-0025597 A | 3/2014 |
| KR | 10-2014-0093529 A | 7/2014 |
| KR | 10-1452950 B1 | 10/2014 |
| KR | 10-1593401 B1 | 2/2016 |
| KR | 10-1595322 B1 | 2/2016 |
| KR | 10-1604509 B1 | 3/2016 |
| KR | 10-2016-0049519 A | 5/2016 |
| KR | 10-2016-0129764 A | 11/2016 |
| KR | 10-2017-0063408 A | 6/2017 |
| KR | 10-2017-0093085 A | 8/2017 |
| KR | 10-1785262 B1 | 10/2017 |
| KR | 10-2018-0059736 A | 6/2018 |
| KR | 10-2018-0121267 A | 11/2018 |
| KR | 10-2019-0006906 A | 1/2019 |
| KR | 10-2019-0065963 A | 6/2019 |
| KR | 10-1989399 B1 | 6/2019 |
| KR | 10-2020-0043612 A | 4/2020 |
| KR | 10-2020-0051101 A | 5/2020 |
| KR | 10-2020-0070649 A | 6/2020 |
| KR | 10-2144056 B1 | 8/2020 |
| KR | 10-2020-0110027 A | 9/2020 |
| KR | 10-2175126 B1 | 11/2020 |
| KR | 10-2021-0095149 A | 7/2021 |
| WO | WO 2015/053580 A1 | 4/2015 |
| WO | WO 2016/129629 A1 | 8/2016 |

(56) References Cited

FOREIGN PATENT DOCUMENTS

| WO | 2020/137296 A1 | 7/2020 |
|---|---|---|
| WO | WO 2021/125535 A1 | 6/2021 |

OTHER PUBLICATIONS

Notice of Allowance for U.S. Appl. No. 17/102,332 dated Aug. 17, 2022, 8 pages.

US Notice of Allowance dated May 18, 2023, issued in U.S. Appl. No. 17/529,172 (12 pages).

EPO Extended European Search Report dated Jan. 3, 2023, issued in European Patent Application No. 22189038.7 (9 pages).

US Notice of Allowance dated Feb. 1, 2023, issued in U.S. Appl. No. 17/073,124 (5 pages).

US Notice of Allowance dated Feb. 1, 2023, issued in U.S. Appl. No. 17/102,332 (5 pages).

US Notice of Allowance dated Mar. 22, 2023, issued in U.S. Appl. No. 17/186,502 (9 pages).

Chinese Office Action, with English translation, dated Jan. 12, 2024, issued in Chinese Patent Application No. 202111318600.9 (19 pages).

Extended European Search Report for corresponding European Patent Application No. 21206169.1, dated Apr. 8, 2022, 9 pages.

Final Office action for related U.S. Appl. No. 17/102,332, dated Apr. 11, 2022, 18 pages.

Korean Office Action from Application No. 10-2020-0124255, dated Feb. 23, 2022, 7 pages.

Notice of Allowance for related U.S. Appl. No. 17/073,124, dated Apr. 8, 2022, 17 pages.

Notice of Allowance for related U.S. Appl. No. 16/209,659, dated Jul. 17, 2020, 8 pages.

Notice of Allowance for related U.S. Appl. No. 17/073,124, dated Feb. 8, 2022, 17 pages.

Notice of Allowance for related U.S. Appl. No. 17/102,412, dated Mar. 24, 2022, 6 pages.

Restriction Requirement for related U.S. Appl. No. 16/209,659, dated Mar. 27, 2020, 5 pages.

US Office Action dated Oct. 20, 2021, issued in U.S. App. No. 17/073,124 (7 pgs.).

EPO Extended European Search Report dated Oct. 15, 2021, issued in European Patent Application No. 21170242.8 (10 pgs.).

Chinese Office Action, with English translation, dated Nov. 19, 2021, issued in corresponding Chinese Patent Application No. 201880077888.5 (22 pgs.).

U.S. Notice of Allowance dated Dec. 8, 2021, issued in U.S. Appl. No. 17/102,412 (10 pgs.).

U.S. Office Action dated Dec. 14, 2021, issued in U.S. Appl. No. 17/102,332 (9 pgs.).

Kim, Yongseon et al., "First-principles and experimental investigation of the morphology of layer-structured $LiNiO_2$ and $LiCoO_2$", *Journal of Materials Chemistry*, 2012, vol. 22, pp. 12874-12881.

Korean Office Action dated May 21, 2020, for corresponding Korean Patent Application No. 10-2018-0153649 (6 pgs.).

Korean Intellectual Property Office Notice of Allowance for corresponding Korean Patent Application No. 10-2018-0153649, dated Sep. 22, 2020, 5 pgs.

Duan, Jianguo et al., "Enhanced compacting density and cycling performance of Ni-riched electrode via building mono dispersed micron scaled morphology", *Journal of Alloys and Compounds*, vol. 695 (2017) pp. 91-99.

International Search Report and Written Opinion for patent application No. PCT/KR2018/015220, dated May 24, 2019, incl. English trans. 22 pgs.

Sun, Yang-Kook, et al., "Synthesis and Characterization of $Li[(Ni_{0.8}Co_{0.1}Mn_{0.1})_{0.8}(Ni_{0.5}Mn_{0.5})_{0.2}]O2$ with the Microscale Core-Shell Structure as the Positive Electrode Material for Lithium Batteries," J. Am. Chem. Soc., vol. 127, 2005, 8 pgs.

EPO Extended European Search Report dated Jul. 23, 2021, issued in corresponding European Patent Application No. 18885458.2 (7 pgs.).

US Office Action dated Nov. 29, 2022, issued in U.S. Appl. No. 17/186,502 (10 pages).

Japanese Office Action dated Dec. 5, 2022, issued in Japanese Patent Application No. 2021-184817 (6 pages).

Li, Guangxin, et al, "Ultrathin Li—Si—O Coating Layer to Stabilize the Surface Structure and Prolong the Cycling Life of Single-Crystal LiNi0.6Co0.2Mn0.2O2 Cathode Materials at 4.5 V," ACS Applied Materials & Interfaces, vol. 13, Feb. 2021, pp. 10952-10963, XP055954371.

EPO Extended European Search Report dated Sep. 2, 2022, issued in corresponding European Patent Application No. 22165926.1 (10 pages).

US Restriction Requirement dated Sep. 23, 2022, issued in U.S. Appl. No. 17/186,502 (6 pages).

Advisory Action for U.S. Appl. No. 17/102,332 dated Jun. 7, 2022, 3 pages.

Notice of Allowance for U.S. Appl. No. 17/102,412 dated Jul. 13, 2022, 5 pages.

Office Action for Japanese Patent Application No. 2021-184817 dated Jun. 19, 2023, 3 pages.

Japanese Office Action dated Sep. 11, 2023, issued in Japanese Patent Application No. 2022-128906, 5 pages.

Korean Office Action dated Oct. 16, 2024, issued in corresponding Korean Patent Application No. 10-2021-0069175 (8 pages).

US Office Action dated Jun. 13, 2024, issued in U.S. Appl. No. 18/329,199 (8 pages).

US Office Action dated Sep. 26, 2024, issued in U.S. Appl. No. 18/603,865 (15 pages).

Chinese Office Action dated Sep. 20, 2024, issued in Chinese Patent Application No. 202210361208.0 (8 pages).

Korean Office Action dated Nov. 21, 2024, issued in Korean Patent Application No. 10-2022-0096847, together with English translation from EPO Global Dossier—"Request for the Submission of an Opinion", 25 pages.

POSITIVE ACTIVE MATERIAL FOR RECHARGEABLE LITHIUM BATTERY, PREPARING METHOD THEREOF AND RECHARGEABLE LITHIUM BATTERY INCLUDING THE SAME

CROSS-REFERENCE TO RELATED APPLICATION

This application claims priority to and the benefit of Korean Patent Application No. 10-2021-0069175 filed in the Korean Intellectual Property Office on May 28, 2021, the entire contents of which are hereby incorporated by reference.

BACKGROUND

1. Field

Example embodiments of the present disclosure are related to a positive active material for a rechargeable lithium battery, a method of preparing the same, and a rechargeable lithium battery including the same.

2. Description of the Related Art

A portable information device such as a cell phone, a laptop, smart phone, and the like or an electric vehicle has used a rechargeable lithium battery having high energy density and easy portability as a driving power source. Recently, research has been actively conducted to use a rechargeable lithium battery having high energy density as a driving power source or power storage power source for hybrid or electric vehicles.

Various positive active materials have been investigated to realize rechargeable lithium batteries for application to such uses. Among them, lithium nickel-based oxide, lithium nickel manganese cobalt composite oxide, lithium nickel cobalt aluminum composite oxide, lithium cobalt oxide, and the like are mainly used as a positive active material. However, these positive active materials have structures that collapse or crack during repeated charge and discharge cycles, and thus, problems of deteriorating or reducing a long-term cycle-life of a rechargeable lithium battery and increasing resistance and thus not exhibiting satisfactory capacity characteristics. Accordingly, development of a novel positive active material securing long-term cycle-life characteristics as well as realizing high capacity and high energy density is being investigated.

SUMMARY

A positive active material for a rechargeable lithium battery having improved cycle-life characteristics while implementing a high capacity, a method of preparing the same and a rechargeable lithium battery including the same are provided.

In an embodiment, a positive active material for a rechargeable lithium battery includes a first positive active material in a form of secondary particles including a plurality of primary particles that are aggregated together, and a second positive active material having a single crystal form, wherein both of the first positive active material and the second positive active material are nickel-based positive active materials, each of the first positive active material and the second positive active material is coated with cobalt, and a maximum roughness of a surface of the second positive active material is greater than or equal to about 15 nm.

In another embodiment, a method of preparing a positive active material for a rechargeable lithium battery includes mixing a first nickel-based hydroxide and a lithium raw material together and performing a first heat-treatment to prepare a first nickel-based oxide in a form of secondary particles in which a plurality of primary particles is aggregated, mixing a second nickel-based hydroxide and a lithium raw material together and performing a second heat-treatment to prepare a second nickel-based oxide, and mixing the first nickel-based oxide, the second nickel-based oxide in a single crystal form, and a cobalt compound together and performing a third heat-treatment to coat the first nickel-based oxide and the second nickel-based oxide with cobalt, thereby obtaining a final positive active material including the first positive active material and the second positive active material.

In another embodiment, a rechargeable lithium battery including a positive electrode including the positive active material, a negative electrode, and an electrolyte is provided.

The positive active material for a rechargeable lithium battery manufactured according to an embodiment and a rechargeable lithium battery including the same may exhibit excellent charge and discharge efficiency and cycle-life characteristics while realizing a high capacity and high energy density.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

DETAILED DESCRIPTION

Figure 1:
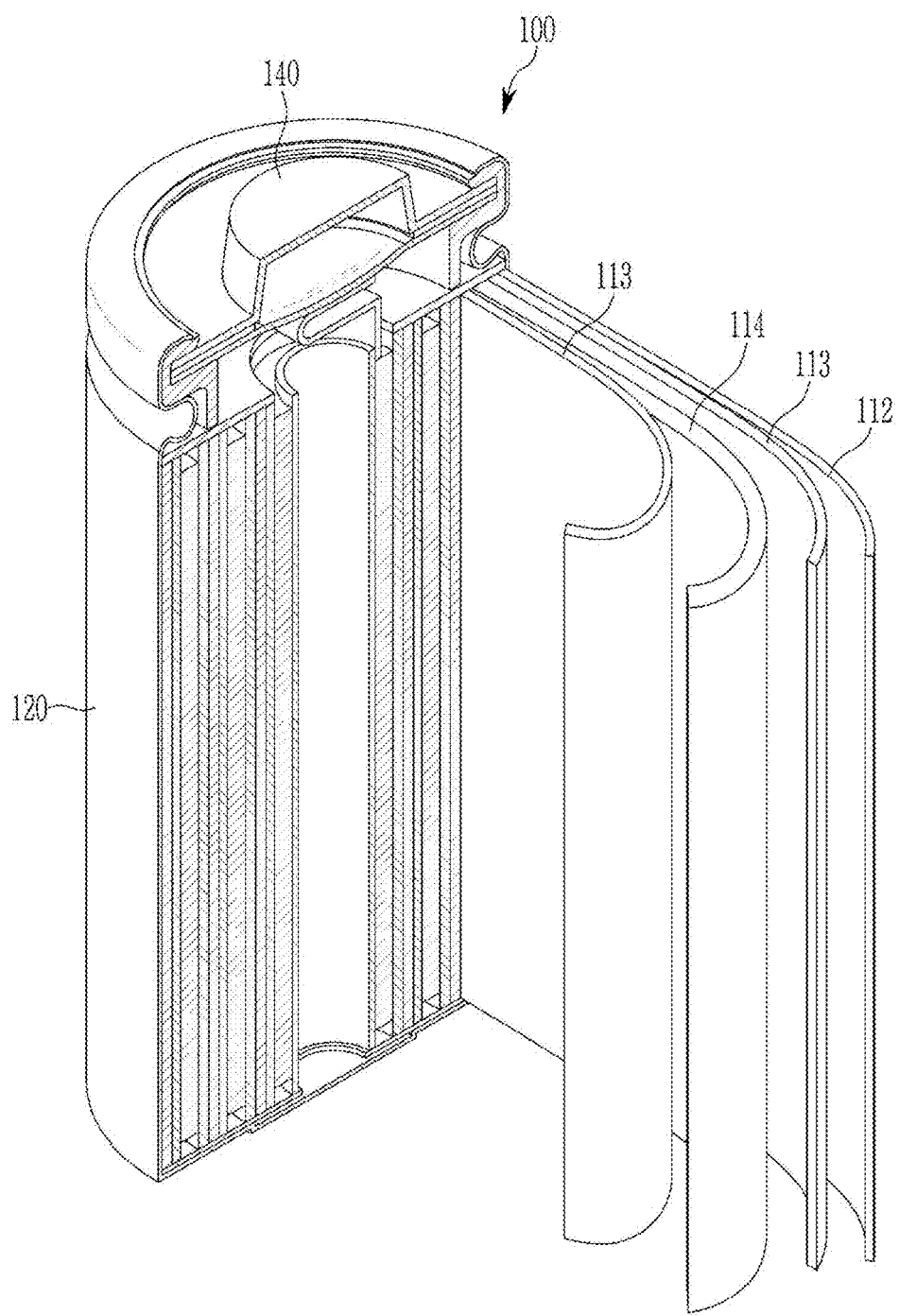
FIG. 1 is a schematic perspective view illustrating a rechargeable lithium battery according to an embodiment.

Hereinafter, example embodiments will be described in more detail so that those of ordinary skill in the art can easily implement them. However, the subject matter of this disclosure may be embodied in many different forms and should not be construed as being limited to the example embodiments set forth herein.

The terminology used herein is used to describe embodiments only, and is not intended to limit the present disclosure. The singular expression includes the plural expression unless the context clearly dictates otherwise.

As used herein, the term "a combination thereof" refers to a mixture, a laminate, a composite, a copolymer, an alloy, a blend, a reaction product, and/or the like of constituents.

Herein, it should be understood that terms such as "comprises," "includes," or "have" are intended to designate the presence of an embodied feature, number, step, element, or a combination thereof, but it does not preclude the possibility of the presence or addition of one or more other features, number, step, element, or a combination thereof.

In the drawings, the thickness of layers, films, panels, regions, etc., may be exaggerated for clarity and like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In addition, the term "layer," as used herein, includes not only a shape formed on the whole surface when viewed from a plan view, but also a shape formed on a partial surface.

In addition, the average particle diameter may be measured by any suitable method generally used in the art. For example, the average particle diameter may be measured by a particle size analyzer, or may be measured by a transmission electron micrograph (TEM) or a scanning electron micrograph (SEM). In some embodiments, it is possible to obtain an average particle diameter value by measuring using a dynamic light scattering method, performing data analysis, counting the number of particles for each particle size range, and calculating the average particle diameter from the results. Unless otherwise defined, the average particle diameter is measured by a particle size analyzer and may mean the diameter (D50) of particles having a cumulative volume of 50 volume % in the particle size distribution.

Positive Active Material

In an embodiment, a positive active material for a rechargeable lithium battery includes a first positive active material in a form of secondary particles formed by aggregation of a plurality of primary particles, and a second positive active material having a single crystal form, wherein both of the first positive active material and the second positive active material are nickel-based positive active materials and are coated with cobalt, respectively, and a maximum roughness of the surface of the second positive active material is greater than or equal to about 15 nm. Such a positive active material may exhibit improved cycle-life characteristics while implementing high capacity and high energy density.

First Positive Active Material

Embodiments of the first positive active material have a polycrystal form, and include secondary particles formed by aggregation of at least two or more primary particles.

The first positive active material according to an embodiment is coated with cobalt. For example, the secondary particles of the first positive active material may be coated with cobalt on the surface of the secondary particles. In some embodiments, the first positive active material may include the secondary particles and cobalt-coating layers on the surfaces of the secondary particles. Embodiments of the first positive active material are coated with cobalt, and thus, structural collapse of the first positive active material resulting from repetitive charge and discharge cycles is effectively suppressed or reduced, and accordingly, room temperature and high temperature cycle-life characteristics may be improved.

Herein, the cobalt coating may be expressed or formed by coating a cobalt-containing compound. The cobalt-containing compound may, for example, include cobalt oxide, cobalt sulfate salt, cobalt nitrate salt, cobalt hydroxide, cobalt carbonate, a compound thereof, a mixture thereof, and/or the like, which may further include lithium, nickel, and/or the like.

The amount of cobalt coating in the first positive active material may be about 0.01 mol % to about 7 mol %, for example, about 0.01 mol % to about 6 mol %, about 0.05 mol % to about 5 mol %, about 0.1 mol % to about 4 mol %, about 0.1 mol % to about 3 mol %, or about 0.5 mol % to about 3 mol %, and may also be about 0.01 atom % to about 7 atom %, about 0.1 atom % to about 5 atom %, or about 0.5 atom % to about 3 atom % based on the total amount of the first positive active material. Embodiments of the rechargeable lithium battery including the first positive active material may implement excellent room temperature and high temperature cycle-life characteristics.

The thickness of the cobalt coating layer in the first positive active material may vary depending on the firing temperature during coating, and cobalt may penetrate into the active material and be coated on and/or doped into the first positive active material according to the firing temperature. Accordingly, the thickness of the cobalt coating layer may be, for example, about 1 nm to about 2 µm, about 1 nm to about 1.5 µm, about 1 nm to about 1 µm, about 1 nm to about 900 nm, about 1 nm to about 700 nm, about 1 nm to about 500 nm, about 1 nm to about 300 nm, about 5 nm to about 100 nm, or about 5 nm to about 50 nm. Embodiments of the rechargeable lithium battery including the first positive active material may exhibit excellent room temperature and high temperature cycle-life characteristics.

The particle diameter of the first positive active material, for example, the average particle diameter of the secondary particles may be about 7 µm to about 25 µm. For example, the particle diameter of the first positive active material (or the average particle diameter of the secondary particles) may be about 9 µm to about 25 µm, about 12 µm to about 25 µm, about 15 µm to about 25 µm, or about 10 µm to about 20 µm. The average particle diameter of the secondary particles of the first positive active material may be equal to or larger than the average particle diameter of the second positive active material having a single crystal form, which will be further described herein below. The positive active material according to an embodiment may be in the form of a mixture of a first positive active material, which has polycrystalline form and is in the form of large particles, and a second positive active material, which has a single crystal form and is in the form of small particles, thereby improving a mixture density, and providing high capacity and high energy density.

The first positive active material may include a lithium nickel composite oxide (or a first nickel-based oxide) as a nickel-based positive active material. The nickel content in the lithium nickel composite oxide may be greater than or equal to about 30 mol %, for example greater than or equal to about 40 mol %, greater than or equal to about 50 mol %, greater than or equal to about 60 mol %, greater than or equal to about 70 mol %, greater than or equal to about 80 mol %, or greater than or equal to about 90 mol % and less than or equal to about 100 mol %, less than or equal to about 99.9 mol % or less than or equal to about 99 mol %, or any range subsumed therein, based on the total amount of elements excluding lithium and oxygen. For example, the nickel content in the lithium nickel composite oxide may be higher than the content of each of other metals such as, for example, cobalt, manganese, and aluminum. When the nickel content satisfies the above range, the positive active material may exhibit excellent battery performance while realizing a high capacity.

In some embodiments, the first positive active material may include a compound represented by Chemical Formula 1.

$$Li_{a1}Ni_{x1}M^1_{y1}M^2_{1-x1-y1}O_2 \qquad \text{Chemical Formula 1}$$

In Chemical Formula 1, 0.9≤a1≤1.8, 0.3≤x1≤1, 0≤y1≤0.7, and $M^1$ and $M^2$ are each independently selected from Al, B, Ba, Ca, Ce, Co, Cr, Cu, F, Fe, Mg, Mn, Mo, Nb, P, S, Si, Sr, Ti, V, W, Zr, and a combination thereof.

The first positive active material may include, for example, a compound of Chemical Formula 2.

$$Li_{a2}Ni_{x2}Co_{y2}M^3_{1-x2-y2}O_2 \qquad \text{Chemical Formula 2}$$

In Chemical Formula 2, 0.9≤a2≤1.8, 0.3≤x2≤1, 0<y2≤0.7, and $M^3$ is selected from Al, B, Ba, Ca, Ce, Cr, Cu, F, Fe, Mg, Mn, Mo, Nb, P, S, Si, Sr, Ti, V, W, Zr, and a combination thereof.

The first positive active material may include, for example, a compound of Chemical Formula 3.

$$Li_{a3}Ni_{x3}Co_{y3}Al_{z3}M^4_{1-x3-y3-z3}O_2 \qquad \text{Chemical Formula 3}$$

In Chemical Formula 3, 0.9≤a3≤1.8, 0.3≤x3<1, 0<y3<0.7, 0<z3<0.4, and $M^4$ is selected from B, Ba, Ca, Ce, Cr, Cu, F, Fe, Mg, Mn, Mo, Nb, P, S, Si, Sr, Ti, V, W, Zr, and a combination thereof.

In the positive active material according to an embodiment, the first positive active material may be included in an amount of about 50 wt % to about 90 wt %, and the second positive active material may be included in an amount of about 10 wt % to about 50 wt % based on the total amount of the first positive active material and the second positive active material. The first positive active material may be for example included in an amount of about 60 wt % to about 90 wt %, or about 70 wt % to about 90 wt % and the second positive active material may be for example included in an amount of about 10 wt % to about 40 wt %, or about 10 wt % to about 30 wt %. When the content ratio of the first positive active material and the second positive active material is as described above, the positive active material including the same may realize high capacity, improve a mixture density, and exhibit high energy density.

Meanwhile, a maximum roughness ($R_{max}$; peak to peak height) of the surface of the first positive active material may be for example about 3 nm to about 100 nm, or about 5 nm to about 50 nm. An average roughness ($R_a$) of the surface of the first positive active material may be about 0.2 nm to about 10 nm, or about 0.5 nm to about 3 nm. In addition, a root mean square roughness ($R_q$) of the surface of the first positive active material may be about 0.5 nm to about 10 nm, or about 0.7 nm to about 3 nm. Details such as the meaning and measurement method of the maximum roughness, the average roughness, and the root mean square roughness will be further described herein below in the section on the second positive electrode active material.

Second Positive Active Material

The second positive active material is in a single crystal form, wherein the single crystal form means that one single particle is present alone without a grain boundary thereinside, and is a monolithic structure in which particles are not aggregated together with one another but present as an independent phase in terms of morphology, and thus may be expressed as a single crystal particle. The positive active material according to the embodiment may exhibit improved cycle-life characteristics while implementing high capacity and high energy density by including the second positive active material.

The second positive active material has no particular limit to a shape but may have various suitable shapes such as a polyhedron, an oval, a plate, a rod, an irregular shape, and/or the like.

The second positive active material according to an embodiment is coated with cobalt. For example, the surface of the second positive active material may be coated with the cobalt-containing compound. The second positive active material may include a single crystal and a cobalt coating layer on the surfaces of the single crystal. Because the second positive active material is coated with cobalt, structural collapse of the second positive active material from repeated charges and discharges is effectively suppressed or reduced, and thus, room temperature and high temperature cycle-life characteristics may be improved.

A method of preparing the positive active material according to an embodiment, which is further described herein below, may be performed not by separately coating the first positive active material and the second positive active material but by coating the mixture together by mixing them and then, concurrently (e.g., simultaneously) performing coating and firing through a third heat-treatment. Accordingly, the second positive active material of the cobalt-coated single crystals has not a smooth or flat surface but an uneven surface having set or specific protrusions and depressions. Accordingly, the surface roughness of the second positive active material is increased, and a specific surface area thereof is also increased. The second positive active material according to an embodiment may improve charge and discharge efficiency and cycle-life characteristics of a battery due to the increased surface roughness and specific surface area, compared with an existing single crystal positive active material coated with cobalt and/or the like.

The second positive active material according to an embodiment has protrusions and depressions on the surface, for example, linear protrusions and depressions or non-linear protrusions and depressions. For example, the cobalt-containing compound may be attached to the surface of the second positive active material of single crystals, for example, linearly or atypically attached thereto, to thereby cover the surface of the single crystal in an uneven form. This coating shape is distinct from an existing island-type coating (e.g., a coating having discrete and non-contiguous islands).

This second positive active material exhibits high surface roughness. The surface roughness may be measured by using an image taken with atomic force microscope (AFM) and/or the like, for example, an optical profiler. Maximum roughness ($R_{max}$; peak to peak height; maximum roughness depth) may be a vertical distance between the highest peak and the lowest valley within a reference length of a roughness cross-section curve (roughness profile). Average roughness ($R_a$) may also be referred to as center line average roughness, which is obtained as an arithmetic average of absolute values of ordinates (length from center to peak) within the reference length of the roughness profile. Root mean square roughness ($R_q$) may be a root average square (rms) of the ordinates within the reference length of the roughness profile. As for such surface roughness, parameters and measurement methods defined in KS B 0601 or ISO 4287/1 may be referenced.

The maximum roughness ($R_{max}$; peak to peak height) of the surface of the second positive active material may be greater than or equal to about 15 nm, for example, greater than or equal to about 20 nm, or may be about 15 nm to about 100 nm, about 15 nm to about 50 nm, about 15 nm to about 40 nm, or about 20 nm to about 35 nm. In this case, the positive active material for a rechargeable lithium battery including the second positive active material exhibits high energy density and high capacity, and may implement excellent charge/discharge efficiency and cycle-life characteristics.

An average roughness ($R_a$) of the surface of the second positive active material may be greater than or equal to about 1.5 nm, for example, greater than or equal to about 1.8 nm, about 1.5 nm to about 10 nm, about 1.5 nm to about 8.0 nm, about 1.5 nm to about 6.0 nm, about 1.8 nm to about 5.0 nm, about 2.0 nm to about 10 nm, or about 3.0 nm to about 10 nm. In this case, the positive active material for a rechargeable lithium battery including the second positive active material may exhibit high energy density and high capacity, and may implement excellent charge/discharge efficiency and cycle-life characteristics.

A root mean square roughness ($R_q$) of the surface of the second positive active material may be greater than or equal to about 2.0 nm, for example, greater than or equal to about 2.3 nm, and may be about 2.0 nm to about 10 nm, about 2.0 nm to about 8 nm, about 2.0 nm to about 6 nm, about 2.3 nm to about 5 nm, about 3.0 nm to about 10 nm, or about 4.0 nm to about 10 nm. In this case, the positive active material for a rechargeable lithium battery including the second positive active material exhibits high energy density and high capacity, and may implement excellent charge/discharge efficiency and cycle-life characteristics.

The BET specific surface area of the entire positive active material including the first positive active material and the second positive active material may be about 0.3 m²/g to about 0.6 m²/g, for example, about 0.3 m²/g to about 0.5 m²/g, or about 0.3 m²/g to about 0.4 m²/g. In this case, the positive active material may realize excellent charge/discharge efficiency and cycle-life characteristics.

The cobalt amount in the second positive active material may be about 0.01 mol % to about 7 mol %, for example, about 0.01 mol % to about 6 mol %, about 0.05 mol % to about 5 mol %, about 0.1 mol % to about 4 mol %, about 0.1 mol % to about 3 mol %, or about 0.5 mol % to about 3 mol % and may be also be about 0.01 atom % to about 7 atom %, about 0.1 atom % to about 5 atom %, or about 0.5 atom % to about 3 atom % based on the total amount of the second positive active material. In this case, the rechargeable lithium battery including the second positive active material may implement excellent room temperature and high temperature cycle-life characteristics.

The thickness of the cobalt coating layer in the second positive active material may be about 1 nm to about 2 μm, for example, about 1 nm to about 1 μm, about 1 nm to about 900 nm, about 1 nm to about 700 nm, about 1 nm to about 500 nm, about 1 nm to about 300 nm, about 5 nm to about 100 nm, or about 5 nm to about 50 nm. In this case, the rechargeable lithium battery including the second positive active material may exhibit excellent room temperature and high temperature cycle-life characteristics.

The average particle diameter of the second positive active material, for example, the average particle diameter of the single crystal may be about 1 μm to about 10 μm, for example, about 1 μm to about 8 μm, about 2 μm to about 7 μm, about 2 μm to about 6 μm, about 2 μm to about 5 μm, and, for example, may be about 2 μm to about 4 μm. The average particle diameter of the second positive active material may be the same as or smaller than that of the first positive active material, and thus the density of the positive active material may be further increased.

The second positive active material may include a lithium nickel-based composite oxide (or a second nickel-based oxide) as a nickel-based active material. The nickel content in the lithium nickel composite oxide may be greater than or equal to about 30 mol %, for example greater than or equal to about 40 mol %, greater than or equal to about 50 mol %, greater than or equal to about 60 mol %, greater than or equal to about 70 mol %, greater than or equal to about 80 mol %, or greater than or equal to about 90 mol % and less than or equal to about 100 mol %, less than or equal to about 99.9 mol %, or less than or equal to about 99 mol % based on the total amount of elements excluding lithium and oxygen. For example, the nickel content in the lithium nickel composite oxide may be higher than the content of each of the other transition metals such as cobalt, manganese, and aluminum. When the nickel content satisfies the above range, the positive active material may exhibit excellent battery performance while realizing a high capacity.

The second positive active material may include for example a compound represented by Chemical Formula 11.

$$Li_{a11}Ni_{x11}M^{11}{}_{y11}M^{12}{}_{1-x11-y11}O_2 \qquad \text{Chemical Formula 11}$$

In Chemical Formula 11, 0.9≤a11≤1.8, 0.3≤x11≤1, 0≤y11≤0.7, and $M^{11}$ and $M^{12}$ are each independently selected from Al, B, Ba, Ca, Ce, Co, Cr, Cu, F, Fe, Mg, Mn, Mo, Nb, P, S, Si, Sr, Ti, V, W, Zr, and a combination thereof.

In Chemical Formula 11, x11 representing the nickel content may be, for example, 0.4≤x11<1, 0.5≤x11<1, 0.6≤x11<1, 0.8≤x11<1, or 0.9≤x11<1. Herein, the positive active material including the same may implement a high capacity.

The second positive active material may be, for example, represented by Chemical Formula 12 or Chemical Formula 13.

$$Li_{a12}Ni_{x12}Co_{y12}Mn_{z12}M^{13}{}_{1-x12-y12-z12}O_2 \qquad \text{Chemical Formula 12}$$

In Chemical Formula 12, 0.9≤a12≤1.8, 0.3≤x12<1, 0<y12<0.7, 0<z12<0.7, and $M^{13}$ is selected from Al, B, Ba, Ca, Ce, Cr, Cu, F, Fe, Mg, Mo, Nb, P, S, Si, Sr, Ti, V, W, Zr, and a combination thereof.

$$Li_{a13}Ni_{x13}Co_{y13}M^{14}{}_{1-x13-y13}O_2 \qquad \text{Chemical Formula 13}$$

In Chemical Formula 13, 0.9≤a13≤1.8, 0.3≤x13<1, 0<y13≤0.7, and $M^{14}$ is selected from Al, B, Ba, Ca, Ce, Cr, Cu, F, Fe, Mg, Mn, Mo, Nb, P, S, Si, Sr, Ti, V, W, Zr, and a combination thereof.

When the second positive active material includes the compound represented by Chemical Formula 12 or Chemical Formula 13, the initial discharge capacity is not lowered while implementing a high capacity, and the effect of improving cycle-life characteristics can be obtained.

In Chemical Formula 12, x12, y12, and z12 may be, for example, in the range: 0.5≤x12<1, 0<y12<0.5, and 0<z12<0.5, 0.6≤x12<1, 0<y12<0.4, and 0<z12<0.4, or 0.8≤x12<1, 0<y12<0.2, and 0<z12<0.2. In Chemical Formula 13, x13 and y13 may be, for example, in the range: 0.5≤x13<1 and 0<y13≤0.5, 0.6≤x13<1 and 0<y13≤0.4, or 0.8≤x13≤0.99, and 0.01≤y13≤0.2.

Method of Preparing Positive Active Material

In an embodiment, a method of preparing a positive active material for a rechargeable lithium battery includes mixing a first nickel-based hydroxide and a lithium raw material and performing a first heat-treatment to prepare a first nickel-based oxide, mixing a second nickel-based hydroxide and a lithium raw material and performing a second heat-treatment to prepare a second nickel-based oxide, and mixing the first nickel-based oxide, the second nickel-based oxide, and a cobalt compound and performing a third heat-treatment to perform a cobalt coating, obtaining a final positive active material including the first positive active material and the second positive active material.

Herein, the first nickel-based oxide and first positive active material have a form of secondary particles formed by aggregation of a plurality of primary particles and the second nickel-based oxide and second positive active material have a single crystal form. The first positive active material may be a material that the first nickel-based oxide is coated with cobalt on the surface, and the second positive active material may be a material that the second nickel-based oxide is coated with cobalt on the surface.

In an embodiment, the first positive active material and the second positive active material may be prepared by not individually coating the first nickel-based oxide and the second nickel-based oxide but concurrently (e.g., simultaneously) coating them after first mixing them together. Accordingly, because the surface of the cobalt-coated single crystal second positive active material is not smooth and flat but uneven, the cobalt-coated single crystal second positive active material has a high surface roughness and a high specific surface area. Accordingly, a positive active material for a rechargeable lithium battery including this second positive active material may exhibit a high specific surface area and thus realize excellent capacity characteristics and cycle-life characteristics.

The first nickel-based hydroxide and the second nickel-based hydroxide are precursors of the positive active material and may be each independently be a nickel hydroxide, a nickel-based composite hydroxide containing an element other than nickel, or a nickel-transition metal elements composite hydroxide containing a transition metal other than nickel.

For example, the first nickel-based hydroxide and second nickel-based hydroxide may each independently be represented by Chemical Formula 21.

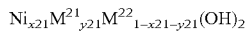

$Ni_{x21}M^{21}_{y21}M^{22}_{1-x21-y21}(OH)_2$

In Chemical Formula 21, $0.3 \leq x21 \leq 1$, $0 \leq y21 \leq 0.7$, and $M^{21}$ and $M^{22}$ are each independently selected from Al, B, Ba, Ca, Ce, Co, Cr, Cu, F, Fe, Mg, Mn, Mo, Nb, P, S, Si, Sr, Ti, V, W, Zr, and a combination thereof.

The first nickel-based hydroxide may have a particle diameter of about 7 μm to about 25 μm, for example, about 10 μm to about 25 μm, about 15 μm to about 25 μm, or about 10 μm to about 20 μm. The second nickel-based hydroxide may have a particle diameter of about 1 μm to about 10 μm, for example, about 2 μm to about 9 μm, about 2 μm to about 8 μm, or about 3 μm to about 7 μm.

The lithium raw material is a lithium source of the positive active material and may include, for example, $Li_2CO_3$, LiOH, a hydrate thereof, or a combination thereof.

When the first nickel-based hydroxide is mixed with the lithium raw material, a ratio of a mole number of lithium in the lithium raw material relative to a mole number of elements excluding H and O included in the first nickel-based hydroxide, for example, may be greater than or equal to about 0.8, greater than or equal to about 0.85, greater than or equal to about 0.9, greater than or equal to about 0.95, or greater than or equal to about 1.0 and less than or equal to about 1.8, less than or equal to about 1.5, less than or equal to about 1.2, less than or equal to about 1.1, or less than or equal to about 1.05.

The first heat-treatment may be performed under an oxidizing gas atmosphere, for example, under an oxygen atmosphere or an air atmosphere. In addition, the first heat-treatment may be performed at about 600° C. to about 900° C. or about 600° C. to about 800° C., for example, for about 5 hours to about 20 hours, or, for example, 5 hours to 15 hours. The first nickel-based oxide obtained through the first heat-treatment may be referred to as a first lithium nickel-based oxide.

When the second nickel-based hydroxide is mixed together with the lithium raw material, a ratio of a mole number of lithium in the lithium raw material relative to a mole number of elements excluding H and O included in the second nickel-based hydroxide may be, for example, greater than or equal to about 0.8, greater than or equal to about 0.85, greater than or equal to about 0.9, greater than or equal to about 0.95, or greater than or equal to about 1.0 and less than or equal to about 1.8, less than or equal to about 1.5, less than or equal to about 1.2, less than or equal to about 1.1, or less than or equal to about 1.05.

The second heat-treatment also may be performed under the oxidizing gas atmosphere, for example, under the oxygen atmosphere or under the air atmosphere. In addition, the second heat-treatment may be performed, for example, at about 800° C. to about 1100° C., or about 900° C. to about 1000° C., for example, for about 5 hours to about 20 hours, or about 5 hours to about 15 hours. The second nickel-based oxide obtained through the second heat-treatment may be referred to as a second lithium nickel-based oxide.

The second nickel-based oxide has a single crystal form, which may be obtained through adjustment of conditions such as a temperature, time, and the like of the second heat-treatment or through various suitable conditions during synthesis of the second nickel-based hydroxide in a co-precipitation method.

The method of preparing a positive active material for a rechargeable lithium battery may further include pulverizing a product obtained after mixing and secondarily heat-treating the second nickel-based hydroxide and the lithium raw material, thereby obtaining the single crystal second nickel-based oxide. The pulverization may be performed by using various suitable pulverizing devices such as a jet mill and/or the like. Herein, the pulverization of the obtained product is a process of obtaining a single-crystal active material, which is distinguished from crushing of a general active material.

When the first nickel-based oxide is mixed with the second nickel-based oxide, the first nickel-based oxide and the second nickel-based oxide may have a weight ratio of about 9:1 to about 5:5, for example, about 9:1 to about 6:4, or about 8:2 to about 7:3. When the first nickel-based oxide and the second nickel-based oxide are mixed together within the aforementioned range, the obtained positive active material may exhibit high-capacity, high energy density and high electrode plate density.

The mixture of the first nickel-based oxide and the second nickel-based oxide is cobalt-coated. The cobalt coating may be performed in a dry or wet method. For example, the dry coating may be performed by thirdly heat-treating the mixture after adding a cobalt compound to the mixture. While the cobalt-containing compound is added to the mixture, a lithium-containing compound such as lithium hydroxide may be added together. The lithium-containing compound may be added in an amount of about 0.01 parts by mole to about 5 parts by mole, or about 0.1 parts by mole to about 3 parts by mole of the total amount of elements excluding lithium and oxygen in the total positive active material.

Or, while the mixture is being mixed and washed with distilled water and the like by adding the mixture thereto, the cobalt compound is added thereto to perform wet coating, and then, the third heat-treatment may be performed. While the cobalt-containing compound is added, a lithium-containing compound such as lithium hydroxide and/or a pH adjusting agent such as sodium hydroxide may be added together.

The cobalt compound may be mixed to include cobalt in an amount of about 0.01 parts by mole to about 7 parts by mole, about 0.01 parts by mole to about 5 parts by mole, or about 0.1 parts by mole to about 3 parts by mole, based on 100 parts by mole of the total amount of elements excluding lithium and oxygen in the total positive active material. The cobalt-containing compound may, for example, include cobalt hydroxide, cobalt carbonate, cobalt sulfate salt, cobalt oxide, cobalt nitrate salt, a compound thereof, a mixture thereof, or the like, which may further include lithium, nickel, and/or the like.

The third heat-treatment may be performed under an oxidizing gas atmosphere. The oxidizing gas atmosphere may be an oxygen or air atmosphere. The third heat-treatment may be performed, for example, about 650° C. to about 900° C. or about 650° C. to about 800° C. The third heat-treatment may be performed during variable time depending on a heat-treatment temperature and/or the like, for example, for about 5 hours to about 30 hours or about 10 hours to about 24 hours.

Subsequently, when the heat-treatment is completed, the heat-treated product is cooled down to room temperature, obtaining the aforementioned positive active material for a rechargeable lithium battery according to an embodiment. The prepared positive active material is in a state that the first positive active material including secondary particles which are formed of the aggregated primary particles is mixed together with the second positive active material having a single crystal form, wherein the first and second positive active materials are respectively coated with cobalt, and protrusions and depressions are formed on the surface of the second positive active material.

Positive Electrode

A positive electrode for a rechargeable lithium battery may include a current collector and a positive active material layer on the current collector. The positive active material layer may include a positive active material, and may further include a binder and/or a conductive material.

The binder improves binding properties of positive active material particles together with one another and together with a current collector. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The content of the binder in the positive active material layer may be about 1 wt % to about 5 wt % based on the total weight of the positive active material layer.

The conductive material is included to provide electrode conductivity (e.g., electrical conductivity). Any suitable electrically conductive material may be used as a conductive material unless it causes a chemical change (e.g., unless it causes an undesirable or unsuitable chemical change in the resultant battery). Examples of the conductive material may include a carbon-based material such as natural graphite, artificial graphite, carbon black, acetylene black, ketjen black, a carbon fiber, carbon nanotube, and the like; a metal-based material of a metal powder or a metal fiber including copper, nickel, aluminum, silver, and the like; a conductive polymer such as a polyphenylene derivative; or a mixture thereof.

The content of the conductive material in the positive active material layer may be about 1 wt % to about 5 wt % based on the total weight of the positive active material layer.

An aluminum foil may be used as the current collector, but is not limited thereto.

Negative Electrode

A negative electrode for a rechargeable lithium battery includes a current collector and a negative active material layer on the current collector. The negative active material layer may include a negative active material, and may further include a binder and/or a conductive material.

The negative active material may include a material that reversibly intercalates/deintercalates lithium ions, a lithium metal, a lithium metal alloy, a material capable of doping/dedoping lithium, or transition metal oxide.

The material that reversibly intercalates/deintercalates lithium ions may include, for example crystalline carbon, amorphous carbon, or a combination thereof as a carbon-based negative active material. The crystalline carbon may be non-shaped, or sheet, flake, spherical, or fiber shaped natural graphite and/or artificial graphite.

The amorphous carbon may be a soft carbon, a hard carbon, a mesophase pitch carbonization product, calcined coke, and/or the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be a Si-based negative active material and/or a Sn-based negative active material. The Si-based negative active material may include silicon, a silicon-carbon composite, $SiO_x$ (0<x<2), and/or a Si-Q alloy (wherein Q is an alkali metal, an alkaline-earth metal, a Group 13 element, a Group 14 element, a Group 15 element, a Group 16 element, a transition metal, a rare earth element, and a combination thereof, but not Si) and the Sn-based negative active material may include Sn, $SnO_2$, and/or Sn—R alloy (wherein R is an alkali metal, an alkaline-earth metal, a Group 13 element, a Group 14 element, a Group 15 element, a Group 16 element, a transition metal, a rare earth element, and a combination thereof, but not Sn). At least one of these materials may be mixed together with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, and a combination thereof.

The silicon-carbon composite may be, for example, a silicon-carbon composite including a core including crystalline carbon and silicon particles and an amorphous carbon coating layer on the surface of the core. The crystalline carbon may be artificial graphite, natural graphite, or a combination thereof. The amorphous carbon precursor may be a coal-based pitch, mesophase pitch, petroleum-based pitch, coal-based oil, petroleum-based heavy oil, and/or a polymer resin such as a phenol resin, a furan resin, and/or a polyimide resin. In this case, the content of silicon may be about 10 wt % to about 50 wt % based on the total weight of the silicon-carbon composite. In addition, the content of the crystalline carbon may be about 10 wt % to about 70 wt % based on the total weight of the silicon-carbon composite, and the content of the amorphous carbon may be about 20 wt % to about 40 wt % based on the total weight of the silicon-carbon composite. In addition, a thickness of the amorphous carbon coating layer may be about 5 nm to about 100 nm. An average particle diameter (D50) of the silicon particles may be about 10 nm to about 20 μm. The average particle diameter (D50) of the silicon particles may be, for example, about 10 nm to about 200 nm. The silicon particles may exist in an oxidized form, and in this case, an atomic content ratio of Si:O in the silicon particles indicating a degree of oxidation may be about 99:1 to about 33:67. The silicon particles may be $SiO_x$ particles, and in this case, the range of x in $SiO_x$ may be greater than about 0 and less than about 2. In the present specification, unless otherwise defined, an average particle diameter (D50) indicates a diameter of a particle where an accumulated volume is about 50 volume % in a particle size distribution.

The Si-based negative active material or Sn-based negative active material may be mixed together with the carbon-based negative active material. When the Si-based negative active material or Sn-based negative active material and the carbon-based negative active material are mixed together and used, the mixing ratio may be a weight ratio of about 1:99 to about 90:10.

In the negative active material layer, the negative active material may be included in an amount of about 95 wt % to about 99 wt % based on the total weight of the negative active material layer.

In an embodiment, the negative active material layer further includes a binder, and may optionally further include a conductive material (an electrically conductive material). The content of the binder in the negative active material layer may be about 1 wt % to about 5 wt % based on the total weight of the negative active material layer. In addition, when the conductive material is further included, the negative active material layer may include about 90 wt % to about 98 wt % of the negative active material, about 1 wt % to about 5 wt % of the binder, and about 1 wt % to about 5 wt % of the conductive material.

The binder serves to well adhere the negative active material particles to each other and also to adhere the negative active material to the current collector. The binder may be a water-insoluble binder, a water-soluble binder, or a combination thereof.

Examples of the water-insoluble binder include polyvinyl chloride, carboxylated polyvinyl chloride, polyvinyl fluoride, an ethylene oxide-containing polymer, an ethylene propylene copolymer, polystyrene, polyvinylpyrrolidone, polyurethane, polytetrafluoro ethylene, polyvinylidene fluoride, polyethylene, polypropylene, polyamideimide, polyimide, or a combination thereof.

The water-soluble binder may include a rubber binder and/or a polymer resin binder. The rubber binder may be selected from a styrene-butadiene rubber, an acrylated styrene-butadiene rubber, an acrylonitrile-butadiene rubber, an acrylic rubber, a butyl rubber, a fluororubber, and a combination thereof. The polymer resin binder may be selected from polyethylene oxide, polyvinylpyrrolidone, polyepichlorohydrin, polyphosphazene, polyacrylonitrile, an ethylene propylene diene copolymer, polyvinylpyridine, chlorosulfonated polyethylene, latex, a polyester resin, an acrylic resin, a phenol resin, an epoxy resin, polyvinyl alcohol, and a combination thereof.

When a water-soluble binder is used as the negative electrode binder, a cellulose-based compound capable of imparting viscosity may be further included as a thickener. As the cellulose-based compound, one or more of carboxymethyl cellulose, hydroxypropylmethyl cellulose, methyl cellulose, or alkali metal salts thereof may be mixed together and used. As the alkali metal, Na, K, and/or Li may be used. The amount of the thickener used may be about 0.1 parts by weight to about 3 parts by weight based on 100 parts by weight of the negative active material.

The conductive material is included to provide electrode conductivity. Any suitable electrically conductive material may be used as a conductive material unless it causes a chemical change (e.g., unless it causes an undesirable or unsuitable chemical change in the resultant battery). Examples of the conductive material include a carbon-based material such as natural graphite, artificial graphite, carbon black, acetylene black, ketjen black, a carbon fiber, carbon nanotube, and the like; a metal-based material of a metal powder or a metal fiber including copper, nickel, aluminum, silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

Rechargeable Lithium Battery

Another embodiment provides a rechargeable lithium battery including a positive electrode, a negative electrode, a separator between the positive electrode and the positive electrode, and an electrolyte. Here, the aforementioned electrode may be the positive electrode and negative electrode.

FIG. 1 is a schematic perspective view illustrating a rechargeable lithium battery according to an embodiment. Referring to FIG. 1, a rechargeable lithium battery 100 according to an embodiment includes a battery cell including a positive electrode 114, a negative electrode 112 facing the positive electrode 114, a separator 113 between the positive electrode 114 and the negative electrode 112, and an electrolyte for a rechargeable lithium battery impregnating the positive electrode 114, the negative electrode 112, and the separator 113, a battery case 120 housing the battery cell, and a sealing member 140 sealing the battery case 120.

The electrolyte includes a non-aqueous organic solvent and a lithium salt.

The non-aqueous organic solvent serves as a medium for transmitting ions taking part in the electrochemical reaction of a battery. The non-aqueous organic solvent may be a carbonate-based, ester-based, ether-based, ketone-based, alcohol-based solvent, or aprotic solvent. Examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent include methyl acetate, ethyl acetate, n-propyl acetate, dimethyl acetate, methyl propionate, ethyl propionate, γ-butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran, and/or the like and the ketone-based solvent may be cyclohexanone, and/or the like. In addition, the alcohol-based solvent may be ethyl alcohol, isopropyl alcohol, etc. and the aprotic solvent may be nitriles such as R—CN (where R is a C2 to C20 linear, branched, or cyclic hydrocarbon group and may include a double bond, an aromatic ring, or an ether bond), amides such as dimethylformamide, dioxolanes such as 1,3-dioxolane, sulfolanes, and/or the like.

The non-aqueous organic solvent may be used alone or in a mixture. When the organic solvent is used in a mixture, the mixture ratio may be controlled in accordance with a desirable battery performance.

In addition, in the case of the carbonate-based solvent, a mixture of a cyclic carbonate and a chain carbonate may be used. In this case, when the cyclic carbonate and the chain carbonate are mixed in a volume ratio of about 1:1 to about 1:9, the electrolyte may exhibit excellent performance.

The non-aqueous organic solvent may further include an aromatic hydrocarbon-based organic solvent in addition to the carbonate-based solvent. In this case, the carbonate-based solvent and the aromatic hydrocarbon-based organic solvent may be mixed in a volume ratio of about 1:1 to about 30:1.

As the aromatic hydrocarbon-based organic solvent, an aromatic hydrocarbon-based compound represented by Chemical Formula I may be used.

Chemical Formula I

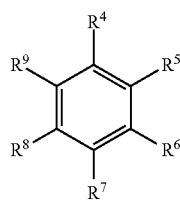

In Chemical Formula I, $R^4$ to $R^9$ are the same or different and are selected from hydrogen, a halogen, a C1 to C10 alkyl group, a C1 to C10 haloalkyl group, and a combination thereof.

Examples of the aromatic hydrocarbon-based solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound of Chemical Formula II as additive in order to improve cycle-life of a battery.

Chemical Formula II

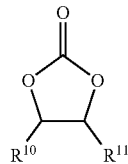

In Chemical Formula II, $R^{19}$ and $R^{11}$ are the same or different, and are selected from hydrogen, a halogen, a cyano group, a nitro group, and fluorinated C1 to C5 alkyl group, provided that at least one of $R^{10}$ and $R^{11}$ is selected from a halogen, a cyano group, a nitro group, and fluorinated C1 to C5 alkyl group, but both of $R^{10}$ and $R^{11}$ are not hydrogen.

Examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be used within an appropriate or suitable range.

The lithium salt dissolved in the non-aqueous organic solvent supplies lithium ions in a battery, enables a basic operation of a rechargeable lithium battery, and improves transportation of the lithium ions between positive and negative electrodes.

Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$, wherein x and y are natural numbers, for example, an integer in a range from 1 to 20, lithium difluoro(bisoxolato) phosphate, LiCl, LiI, $LiB(C_2O_4)_2$ (lithium bis(oxalato) borate, LiBOB), and lithium difluoro(oxalato)borate (LiDFOB).

The lithium salt may be used in a concentration in a range from about 0.1 M to about 2.0 M. When the lithium salt is included at the above concentration range, an electrolyte may have excellent performance and lithium ion mobility due to optimal or suitable electrolyte conductivity and viscosity.

The separator 113 separates a positive electrode 114 and a negative electrode 112 and provides a transporting passage for lithium ions and may be any suitable, generally-used separator in a lithium ion battery. In other words, the separator may have low resistance to ion transport and excellent impregnation for an electrolyte. For example, the separator may include a glass fiber, polyester, polyethylene, polypropylene, polytetrafluoroethylene, or a combination thereof. It may have a form of a non-woven fabric or a woven fabric. For example, in a lithium ion battery, a polyolefin-based polymer separator such as polyethylene separator and polypropylene separator is mainly used. In order to ensure the heat resistance or mechanical strength, a coated separator including a ceramic component and/or a polymer material may be used. Optionally, it may have a mono-layered or multi-layered structure.

Rechargeable lithium batteries may be classified as lithium ion batteries, lithium ion polymer batteries, and lithium polymer batteries according to the presence of a separator and the kind of electrolyte used therein. The rechargeable lithium batteries may have a variety of suitable shapes and sizes, and include cylindrical, prismatic, coin, or pouch-type batteries (e.g., batteries having a pouch shape), and may be thin film batteries or may be rather bulky in size. Structures and manufacturing methods for lithium ion batteries pertaining to this disclosure may be any suitable ones generally used in the art.

The rechargeable lithium battery according to an embodiment may be used in an electric vehicle (EV), a hybrid electric vehicle such as a plug-in hybrid electric vehicle (PHEV), and portable electronic device because it implements a high capacity and has excellent storage stability, cycle-life characteristics, and high rate characteristics at high temperatures.

Hereinafter, examples of embodiments of the present disclosure and comparative examples are described. It is to be understood, however, that the examples are for the purpose of illustration and are not to be construed as limiting the present disclosure.

EXAMPLE 1

1. Preparation of First Nickel-Based Oxide in the Form of Secondary Particles

First, a first nickel-based hydroxide ($Ni_{0.95}Co_{0.04}Mn_{0.01}OH$) prepared through a co-precipitation method is prepared. The first nickel-based hydroxide and LiOH are mixed together, so that lithium is mixed in a mole ratio of 1.04 based on the total amount of elements excluding H and O of the first nickel-based hydroxide and then, the resultant is primarily heat-treated at about 750° C. for 15 hours under an oxygen atmosphere, obtaining a first nickel-based oxide ($LiNi_{0.95}Co_{0.04}Mn_{0.01}O_2$). The obtained first nickel-based oxide has an average particle diameter of about 13.8 μm and is in the form of secondary particles composed of two or more primary particles.

2. Preparation of Second Nickel-Based Oxide in Single Crystal Form Co-Precipitation Process Nickel sulfate ($NiSO_4·6H_2O$), cobalt sulfate ($CoSO_4·7H_2O$), and manganese sulfate ($MnSO_4·H_2O$) are dissolved in distilled water as a solvent, preparing a raw metal material mixed solution. In order to form a complex, an ammonia water ($NH_4OH$) diluent and sodium hydroxide (NaOH) as a precipitant are prepared. Subsequently, the raw metal material mixed solution, the ammonia water, and the sodium hydroxide are each put into a reactor. While stirred, a reaction proceeds for about 20 hours. Subsequently, the resultant slurry solution in the reactor is filtered, washed with distilled water with high purity, and dried for 24 hours, obtaining a second nickel-based hydroxide ($Ni_{0.94}Co_{0.05}Mn_{0.01}(OH)_2$) powder. The obtained second nickel-based hydroxide powder has an average particle diameter of about 4.0 μm and a specific surface area of about 15 $m^2/g$, which is measured in a BET method.

Oxidation Process

The obtained second nickel-based hydroxide is mixed together with LiOH to satisfy Li/(Ni+Co+Mn)=1.05 and put in a furnace and then, secondarily heat-treated at 910° C. for 8 hours under an oxygen atmosphere, obtaining a second nickel-based oxide ($LiNi_{0.94}Co_{0.05}Mn_{0.01}O_2$). Subsequently, the obtained second nickel-based oxide is pulverized for about 30 minutes and then, separated/dispersed into a plurality of second nickel-based oxide having a single crystal structure. The second nickel-based oxide having a single crystal structure has an average particle diameter of about 3.7 μm.

3. Cobalt Coating and Preparation of Final Positive Active Material

The first nickel-based oxide and the second nickel-based oxide are mixed together in a weight ratio of 7:3, and the resultant mixture is washed in a weight ratio of 1:1 with water in a stirrer and dried at 150° C. Herein, 5 parts by mole of lithium hydroxide and 3 parts by mole of cobalt oxide based on 100 parts by mole of transition metal elements of the nickel-based oxides are additionally mixed therewith and then, put in a furnace and thirdly heat-treated at about 700° C. for 15 hours under an oxygen atmosphere. Subsequently, the furnace is cooled down to room temperature, obtaining a final positive active material in which the first positive active material and the second positive active material are mixed together.

The final positive active material is a mixture of the first positive active material in a secondary particle form and the second positive active material having a single crystal form, which are respectively coated with cobalt.

Figure 2:
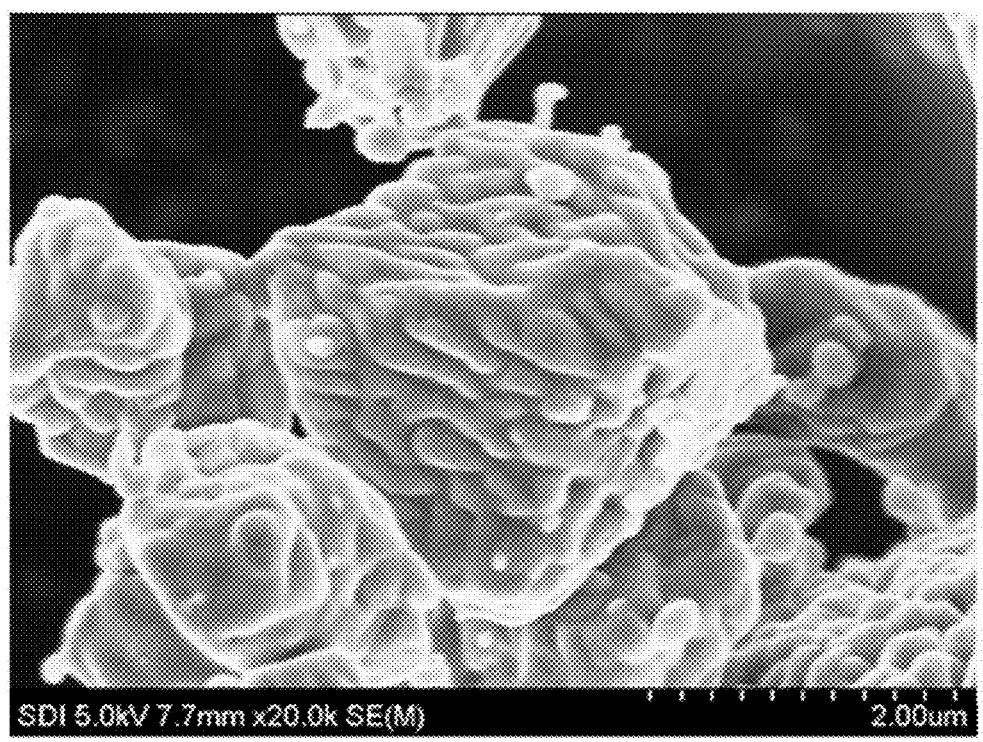
FIG. 2 is a scanning electron microscopic photograph of the second positive active material of Example 1.

FIG. 2 is a scanning electron microscopic photograph of the second positive active material prepared according to Example 1. Referring to FIG. 2, protrusions and depressions are formed on the surface of the second positive active material having a single crystal form.

4. Manufacture of Positive Electrode 95 wt % of the final positive active material, 3 wt % of a polyvinylidene fluoride binder, and 2 wt % of carbon nanotube conductive material are mixed together in an N-methylpyrrolidone solvent to prepare positive active material slurry. The resultant positive active material slurry is applied to an aluminum current collector, dried, and then compressed to manufacture a positive electrode.

5. Manufacture of Rechargeable Lithium Battery Cell

A coin half-cell is manufactured by providing a separator having a polyethylene polypropylene multilayer structure between the manufactured positive electrode and lithium metal negative electrode, and injecting an electrolyte solution in which 1.0 M $LiPF_6$ lithium salt was added to a solvent in which ethylene carbonate and diethyl carbonate are mixed together in a volume ratio of 50:50.

EXAMPLE 2

A positive active material, a positive electrode, and a cell are manufactured according to the same method as Example 1 except that the cobalt coating is performed utilizing a wet method described in "3. cobalt coating and preparation of a final positive active material" of Example 1. The cobalt coating process is as follows. The first nickel-based oxide and the second nickel-based oxide are mixed together in a weight ratio of 7:3 and then, put in distilled water and washed therewith, while mixed. Subsequently, 3 parts by mole of cobalt sulfate ($CoSO_4$) based on 100 parts by mole of transition metal elements of the nickel-based oxides is slowly added thereto to perform cobalt coating. In addition, sodium hydroxide (NaOH) is slowly added thereto. Then, a product obtained therefrom is dried at 150° C. for 12 hours. The dried material is put in a furnace and thirdly heat-treated at about 700° C. for 15 hours under an oxygen atmosphere. Subsequently, the furnace is cooled down to room temperature, obtaining a final positive active material in which the first and second positive active materials are mixed. In the final positive active material, the second positive active material having a single crystal form has protrusions and depressions formed on the surface and an average particle diameter of about 4 μm.

COMPARATIVE EXAMPLE 1

A positive active material, a positive electrode, and a cell are manufactured according to the same method as Example 1 except that the first nickel-based oxide and the second nickel-based oxide are not mixed together first and then, coated but are instead individually coated and then, mixed together as described in "3. cobalt coating and preparation of a final positive active material" of Example 1. The cobalt coating proceeds as follows. 5 parts by mole of lithium hydroxide and 3 parts by mole of cobalt oxide based on 100 parts by mole of transition metal elements are mixed together with the first nickel-based oxide and then, put in a furnace and thirdly heat-treated at about 700° C. for 15 hours under an oxygen atmosphere and then, cooled down to room temperature, obtaining a first positive active material. In addition, 5 parts by mole of lithium hydroxide and 3 parts by mole of cobalt oxide based on 100 parts by mole of transition metal elements are mixed together with the second nickel-based oxide and then, put in a furnace and thirdly heat-treated at about 850° C. for 15 hours under an oxygen atmosphere and then, cooled down to room temperature, obtaining a second positive active material. The cobalt-coated first positive active material and the cobalt-coated second positive active material are mixed together in a weight ratio of 7:3, preparing a final positive active material according to Comparative Example 1.

Figure 3:
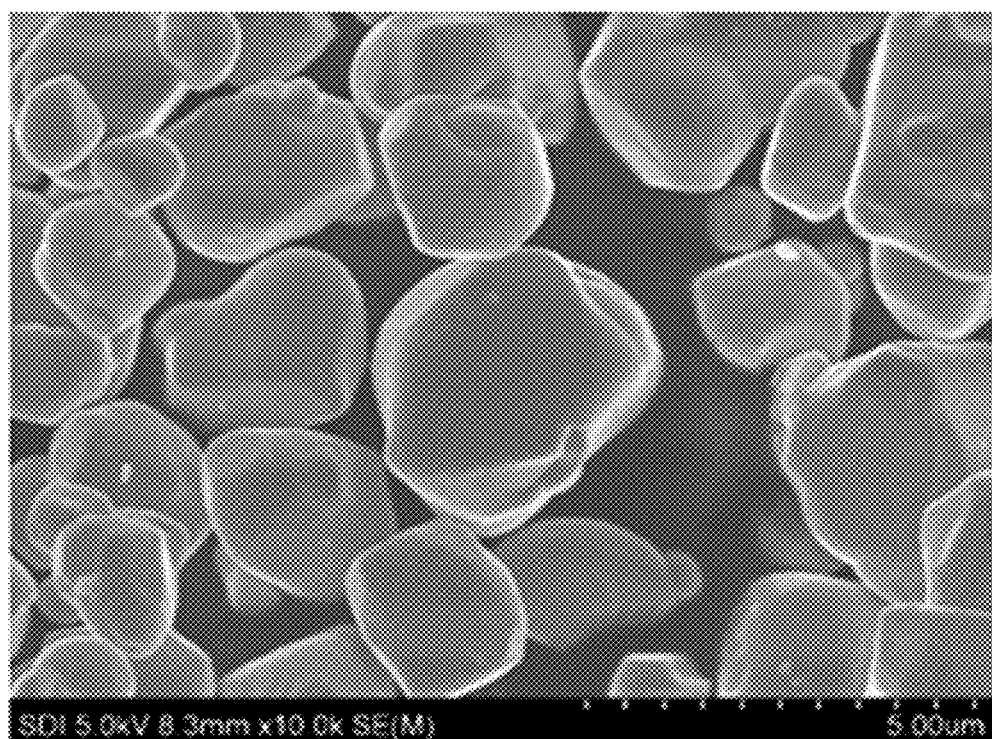
FIG. 3 is a scanning electron microscopic photograph of the second positive active material of Comparative Example 1.

FIG. 3 is a scanning electron microscopic photograph of the second positive active material prepared according to Comparative Example 1. Referring to FIG. 3, the surface of the second positive active material of Comparative Example 1 has no protrusions and depressions on the surface but is instead smooth and flat.

COMPARATIVE EXAMPLE 2

A positive active material and a cell are manufactured according to substantially the same method as Comparative Example 1 except that the third heat-treatment of the second nickel-based oxide is performed at about 700° C. for 15 hours under an oxygen atmosphere.

Figure 4:
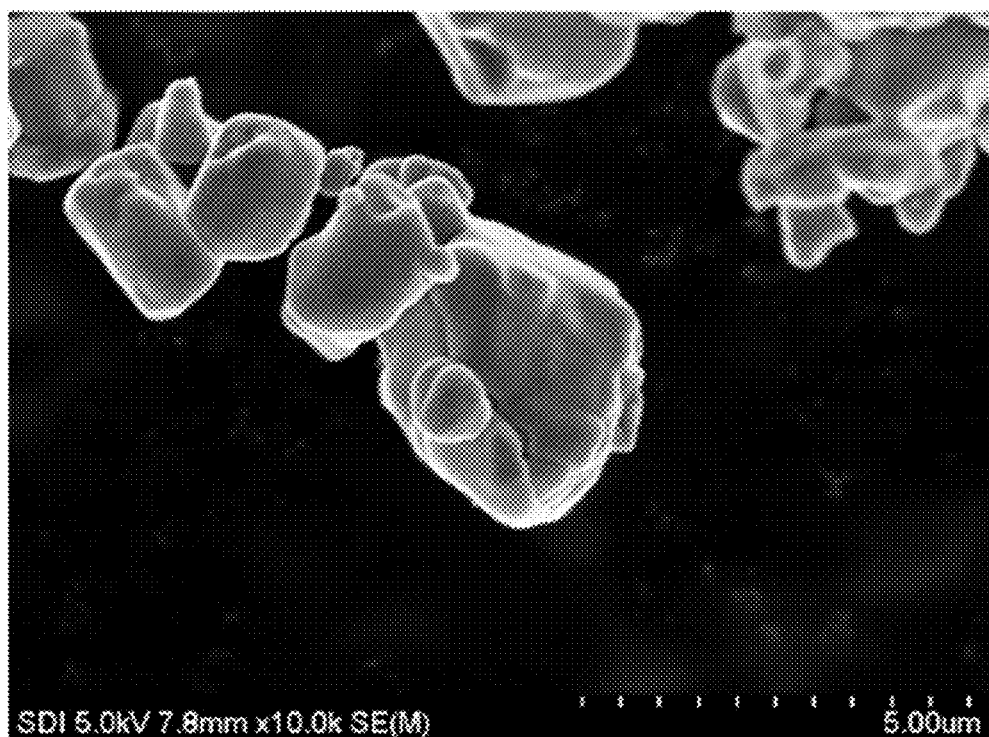
FIG. 4 is a scanning electron microscopic photograph of the second positive active material of Comparative Example 2.

FIG. 4 is a scanning electron microscopic photograph of the second positive active material prepared according to Comparative Example 2. Referring to FIG. 4, the surface of the second positive active material of Comparative Example 2 has no protrusions and depressions but is instead smooth and flat.

EVALUATION EXAMPLE 1

Evaluation of Surface Roughness of Positive Active Material

The positive active materials according to Examples 1 and 2 and Comparative Examples 1 and 2 are measured with respect to surface roughness of the positive active materials through a surface roughness meter using atomic force microscopy (scan speed: 0.25 μm/s, non-contact mode range: 250 nm×250 nm, DME UHV AFM). The results for the second positive active material are shown in Table 1, and the results for the first positive active material are shown in Table 2.

TABLE 1

| Second Positive Active Material | Example 1 | Example 2 | Comparative Example 1 | Comparative Example 2 |
|---|---|---|---|---|
| Maximum roughness ($R_{max}$; peak to peak height) (nm) | 33 | 23 | 6.9 | 9.9 |
| Average roughness ($R_a$) (nm) | 3.30 | 1.90 | 0.74 | 0.97 |
| Root mean square roughness ($R_q$) (nm) | 4.3 | 2.4 | 0.9 | 1.2 |

Referring to Table 1, the second positive active materials of the examples exhibit high maximum roughness, average roughness, and root mean square roughness, compared with the second positive active material of the comparative examples.

TABLE 2

| First Positive Active Material | Example 1 | Comparative Example 1 |
|---|---|---|
| Maximum roughness ($R_{max}$, nm) | 7.0 | 9.5 |
| Average roughness ($R_a$, nm) | 0.78 | 1.02 |
| Root mean square roughness ($R_q$, nm) | 0.9 | 1.1 |

Referring to Table 2, the surface roughness of the first positive electrode active material in the form of secondary particles was analyzed to show little difference between Example 1 of the simultaneous coating method and Comparative Example 1 of the individual coating method (where the first nickel-based oxide and the second nickel-based oxide are coated separately).

EVALUATION EXAMPLE 2

Evaluation of Specific Surface Area

The positive active materials of Examples 1 and 2 and Comparative Examples 1 and 2 are measured with respect to a specific surface area, and the results are shown in Table 3. The specific surface area is measured by using a physical and chemical adsorption phenomenon and a Brunauer-Emmett-Teller (BET) method. In other words, after measuring weights of the active materials, nitrogen is absorbed on the surface of the active materials, and an amount of the absorbed nitrogen gas is measured and used to obtain the specific surface area by using the BET method.

TABLE 3

| | BET specific surface area (m²/g) |
|---|---|
| Example 1 | 0.3758 |
| Example 2 | 0.3582 |
| Comparative Example 1 | 0.2529 |
| Comparative Example 2 | 0.2590 |

Referring to Table 3, the positive active materials including the first and second positive active materials according to Examples 1 and 2 exhibit an increased specific surface area, compared with the positive active materials of the comparative examples.

EVALUATION EXAMPLE 3

Charging/discharging Efficiency and Cycle-Life Characteristics

The coin half cells of Examples 1 and 2 and Comparative Examples 1 and 2 are respectively charged under constant current (0.2 C) and constant voltage (4.25 V, 0.05 C cut-off) conditions to measure charge capacity and then, paused for 10 minutes and discharged down to 3.0 V under a constant current (0.2 C) condition to measure discharge capacity. A ratio the discharge capacity relative to the charge capacity is shown as charge and discharge efficiency. The results are shown in Table 4.

In addition, the cells are initially charged and discharged and then, 50 times charged and discharged at 1 C at 45° C. to measure the 50th discharge capacity, and a ratio (%) of the 50th discharge capacity relative to the initial discharge capacity is expressed as capacity retention, that is, cycle-life characteristics in Table 4.

TABLE 4

| | Charge capacity (mAh/g) | Discharge capacity (mAh/g) | Efficiency (%) | 50th cycle capacity retention (%) |
|---|---|---|---|---|
| Example 1 | 237.7 | 213.7 | 89.9 | 95.0 |
| Example 2 | 238.3 | 210.8 | 88.5 | 97.2 |

TABLE 4-continued

| | Charge capacity (mAh/g) | Discharge capacity (mAh/g) | Efficiency (%) | 50th cycle capacity retention (%) |
|---|---|---|---|---|
| Comparative Example 1 | 236.9 | 206.3 | 87.2 | 94.8 |
| Comparative Example 2 | 233.8 | 200.1 | 85.5 | 94.3 |

Referring to Table 4, Examples 1 and 2 exhibit increased discharge capacity and improved charge and discharge efficiency and also, improved high temperature cycle-life characteristics, compared with Comparative Examples 1 and 2 in which the first and second positive active materials are separately cobalt-coated and fired.

While the subject matter of this disclosure has been described in connection with what is presently considered to be practical example embodiments, it is to be understood that the subject matter of the present disclosure is not limited to the disclosed embodiments. On the contrary, this disclosure is intended to cover various modifications and equivalent arrangements included within the spirit and scope of the appended claims, and equivalents thereof.

DESCRIPTION OF SYMBOLS

| 100: rechargeable lithium battery | 112: negative electrode |
|---|---|
| 113: separator | 114: positive electrode |
| 120: battery case | 140: sealing member |

What is claimed is:

1. A positive active material for a rechargeable lithium battery, comprising:
a first positive active material in a form of secondary particles comprising a plurality of primary particles that are aggregated together, and
a second positive active material having a single crystal form,
wherein both of the first positive active material and the second positive active material are nickel-based positive active materials,
each of the first positive active material and the second positive active material is coated with cobalt, and
a maximum roughness ($R_{max}$; peak to peak height) of a surface of the second positive active material is greater than or equal to about 15 nm.

2. The positive active material of claim 1, wherein:
an average roughness ($R_a$) of the surface of the second positive active material is greater than or equal to about 1.5 nm, and
a root mean square roughness ($R_q$) of the surface of the second positive active material is greater than or equal to about 2.0 nm.

3. The positive active material of claim 1, wherein a BET specific surface area of the positive active material including the first positive active material and the second positive active material is about 0.3 m²/g to about 0.6 m²/g.

4. The positive active material of claim 1, wherein the second positive active material has protrusions and depressions on the surface of the second positive active material.

5. The positive active material of claim 1, wherein:
an average particle diameter of the first positive active material is about 7 μm to about 25 μm, and
an average particle diameter of the second positive active material is about 1 μm to about 10 μm.

6. The positive active material of claim 1, wherein the first positive active material is included in an amount of about 50 wt % to about 90 wt %, and the second positive active material is included in an amount of about 10 wt % to about 50 wt % based on the total amount of the first positive active material and the second positive active material.

7. The positive active material of claim 1, wherein:
the first positive active material comprises a compound represented by Chemical Formula 1, and
the second positive active material comprises a compound represented by Chemical Formula 11:

$$Li_{a1}Ni_{x1}M^1_{y1}M^2_{1-x1-y1}O_2 \quad \text{Chemical Formula 1}$$

wherein, Chemical Formula 1, 0.9≤a1≤1.8, 0.3≤x1≤1, 0≤y1≤0.7, and $M^1$ and $M^2$ are each independently selected from Al, B, Ba, Ca, Ce, Co, Cr, Cu, F, Fe, Mg, Mn, Mo, Nb, P, S, Si, Sr, Ti, V, W, Zr, and a combination thereof, $$Li_{a11}Ni_{x11}M^{11}_{y11}M^{12}_{1-x11-y11}O_2 \quad \text{Chemical Formula 11}$$

wherein, in Chemical Formula 11, 0.9≤a11≤1.8, 0.3≤x11≤1, 0≤y11≤0.7, and $M^{11}$ and $M^{12}$ are each independently selected from Al, B, Ba, Ca, Ce, Co, Cr, Cu, F, Fe, Mg, Mn, Mo, Nb, P, S, Si, Sr, Ti, V, W, Zr, and a combination thereof.

8. A method of preparing a positive active material for a rechargeable lithium battery as claimed in claim 1, the method comprising:
mixing a first nickel-based hydroxide and a lithium raw material together and performing a first heat-treatment to prepare a first nickel-based oxide in a form of secondary particles comprising a plurality of primary particles that are aggregated together;
mixing a second nickel-based hydroxide together with a lithium raw material and performing a second heat-treatment to prepare a second nickel-based oxide in a single crystal form, and
mixing the first nickel-based oxide, the second nickel-based oxide, and a cobalt compound together and performing a third heat-treatment to coat the first nickel-based oxide and the second nickel-based oxide with cobalt, and obtaining a final positive active material including the first positive active material and the second positive active material.

9. The method of claim 8, wherein the first nickel-based hydroxide and the second nickel-based hydroxide are each independently represented by Chemical Formula 21:

$$Ni_{x21}M^{21}_{y21}M^{22}_{1-x21-y21}(OH)_2 \quad \text{Chemical Formula 21}$$

wherein, in Chemical Formula 21, 0.3≤x21≤1, 0≤y21≤0.7, and $M^{21}$ and $M^{22}$ are each independently selected from Al, B, Ba, Ca, Ce, Co, Cr, Cu, F, Fe, Mg, Mn, Mo, Nb, P, S, Si, Sr, Ti, V, W, Zr, and a combination thereof.

10. The method of claim 8, wherein:
the mixing of the first nickel-based hydroxide together with the lithium raw material is performed in a ratio of a mole number of lithium in the lithium raw material relative to a mole number of elements excluding hydrogen and oxygen included in the first nickel-based hydroxide of greater than or equal to about 0.9 and less than or equal to about 1.2, and
the mixing of the second nickel-based hydroxide together with the lithium raw material is performed in a ratio of a mole number of lithium in the lithium raw material relative a mole number of elements excluding hydrogen and oxygen included in the second nickel-based hydroxide of greater than or equal to about 0.9 and less than or equal to about 1.2.

11. The method of claim 8, wherein the first heat-treatment is performed at about 600° C. to about 900° C.

12. The method of claim 8, wherein the first heat-treatment is performed for about 5 hours to about 20 hours.

13. The method of claim 8, wherein the second heat-treatment is performed at about 800° C. to about 1100° C.

14. The method of claim 8, wherein the second heat-treatment is performed for about 5 hours to about 20 hours.

15. The method of claim 8, wherein:
the preparing of the second nickel-based oxide comprises obtaining the second nickel-based oxide in the single crystal form by mixing the second nickel-based hydroxide together with the lithium raw material, secondarily heat-treating the resultant mixture, and pulverizing a resultant therefrom.

16. The method of claim 8, wherein:
the mixing of the first nickel-based oxide and the second nickel-based oxide is performed by mixing the first nickel-based oxide and the second nickel-based oxide together in a weight ratio of about 9:1 to about 5:5.

17. The method of claim 8, wherein:
the mixing of the first nickel-based oxide, the second nickel-based oxide, and the cobalt compound together is performed so that cobalt included in the cobalt compound is included in an amount of about 0.01 parts by mole to about 7 parts by mole, based on 100 parts by mole of the total amount of elements excluding lithium and oxygen in the first nickel-based oxide and the second nickel-based oxide.

18. The method of claim 8, wherein the third heat-treatment is performed at about 650° C. to about 900° C.

19. The method of claim 8, wherein the third heat-treatment is performed for about 5 hours to about 30 hours.

20. A rechargeable lithium battery comprising:
a positive electrode including the positive active material of claim 1, a negative electrode, and an electrolyte.

* * * * *